United States Patent
Avizienis

(10) Patent No.: US 7,861,106 B2
(45) Date of Patent: Dec. 28, 2010

(54) HIERARCHICAL CONFIGURATIONS IN ERROR-CORRECTING COMPUTER SYSTEMS

(75) Inventor: Algirdas Avizienis, Santa Monica, CA (US)

(73) Assignee: A. Avizienis and Associates, Inc., Santa Monica, CA (US)

( * ) Notice: Subject to any disclaimer, the term of this patent is extended or adjusted under 35 U.S.C. 154(b) by 319 days.

(21) Appl. No.: 11/506,455

(22) Filed: Aug. 18, 2006

(65) Prior Publication Data

US 2007/0067673 A1  Mar. 22, 2007

Related U.S. Application Data

(60) Provisional application No. 60/709,492, filed on Aug. 19, 2005.

(51) Int. Cl.
  *G06F 11/00* (2006.01)
(52) U.S. Cl. .......................................................... 714/2
(58) Field of Classification Search .................. 714/12, 714/2
  See application file for complete search history.

(56) References Cited

U.S. PATENT DOCUMENTS

| | | | |
|---|---|---|---|
| 5,740,357 A * | 4/1998 | Gardiner et al. ................ 714/57 |
| 6,012,152 A * | 1/2000 | Douik et al. .................... 714/26 |
| 6,490,659 B1 * | 12/2002 | McKean et al. ............. 711/141 |
| 6,618,825 B1 * | 9/2003 | Shaw .......................... 714/55 |
| 6,728,916 B2 * | 4/2004 | Chen et al. ................... 714/733 |
| 2002/0046365 A1 * | 4/2002 | Avizienis ...................... 714/43 |
| 2002/0152425 A1 * | 10/2002 | Chaiken et al. ............... 714/23 |
| 2003/0005362 A1 * | 1/2003 | Miller et al. .................. 714/27 |
| 2003/0034825 A1 * | 2/2003 | Hsu et al. .................... 327/530 |
| 2003/0074444 A1 * | 4/2003 | Ahrens et al. ................ 709/224 |
| 2004/0078732 A1 * | 4/2004 | Meaney ....................... 714/57 |
| 2005/0144533 A1 * | 6/2005 | LeVangia et al. .............. 714/43 |

OTHER PUBLICATIONS

Demaine, Erik D. "Cache-Oblivious Algorithms and Data Structures", Lecture Notes in Computer Science, BRICS, University of Aarhus, Denmark, Jun. 27-Jul. 1, 2002.*

Algirdas Avizienis, "A fault tolerance infrastructure for dependable computing with high performance COTS components", DSN 2000, New York, Jun. 2000, pp. 492-500.

(Continued)

*Primary Examiner*—Scott T Baderman
*Assistant Examiner*—Yair Leibovich
(74) *Attorney, Agent, or Firm*—Peter I. Lippman

(57) ABSTRACT

When errors arise in a computing system that has plural modules, this invention corrects those errors. In the first instance, the invention excludes the computing system itself, but receives error messages from the plural modules of that system—along plural receiving connections, respectively. Plural sending connections return corrective responses to plural modules of that system, respectively. In a second instance, the invention further incorporates that system. The invention is hierarchical: plural levels or tiers of apparatus and function are present—a first (typically uppermost) one directly serving that system as described above, and others (lower) that analogously serve the first tier of the invention—and then also the subsequent tiers, in a cascading or nested fashion, down to preferably a bottom-level tier supporting all the upper ones. Each level preferably controls power interruption and restoration to higher levels. Ideally the hierarchy is in the form of a "system on chip".

20 Claims, 3 Drawing Sheets

OTHER PUBLICATIONS

Figure 1:
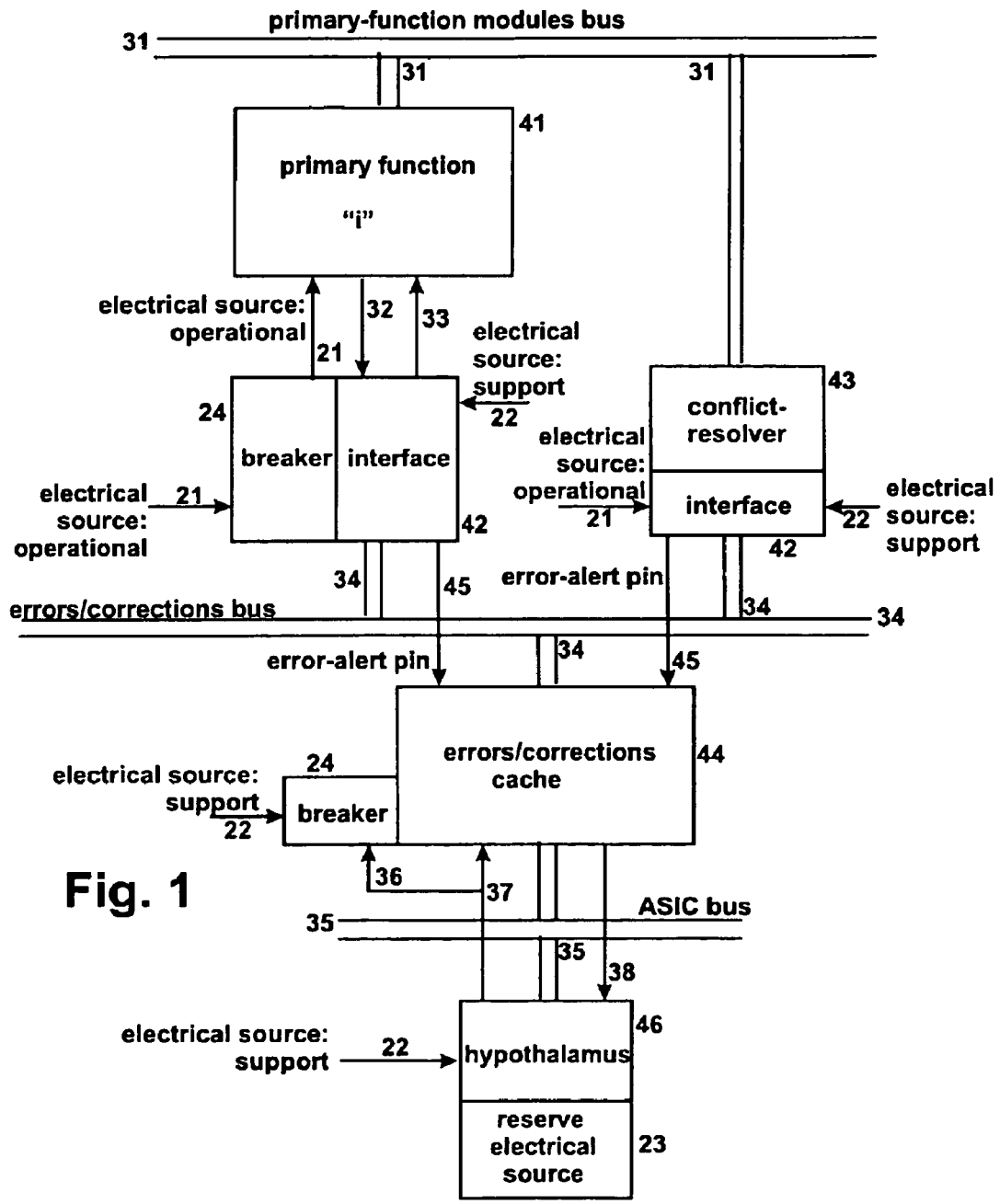

Algirdas Avizienis et al., Microprocessor entomology: A taxonomy of design faults in COTS . . . , Dependable Computing . . . 7, IEEE Computer Society Press, 1999, pp. 3-23.

Algirdas Avizienis et al., Assessment of the applicability of COTS microprocessors in high confidence computing systems . . . , Proceedings of ICDSN 2000, Jun. 2000.

T.J. Siegel et al., IBM's S/390 G5 microprocessor design, IEEE Micro, 19(2):12-23, Mar./Apr. 1999.

D. Johnson, The Intel 432: a VLSI architecture for fault-tolerant computer systems, Computer 17(8):40-49, Aug. 1984.

Intel Corp. P6 Family of Processors Hardware Developer's Manual, Sep. 1998, Order No. 244001-001.

Ziatech Corp. Redundant CPU Architecture for High Availability Systems, White paper, Oct. 1999, available at www.ziatech.com.

Intel Corp. The Pentium II Xeon Processor Server Platform System Management Guide, Jun. 1998, Order No. 243835-001.

Intel Corp. The Pentium III Processor Specification Update, May 2001, Order No. 244453-029.

Algirdas Avizienis et al., Fault tolerance by design diversity: concepts and experiments, Computer, 17(8):67-80, Aug. 1984.

Y. C. Yeh, Dependability of the 777 primary flight control system, in R. K. Iyer et al., editors, Dependable computing . . . 5, IEEE Computer Society Press, 1997, pp. 3-17.

M. K. Joseph et al., A fault tolerance approach to computer viruses, Proc. Of the 1988 IEEE Symposium on Security and Privacy, Apr. 1988, pp. 52-58.

Algirdas Avizienis, Toward systematic design of fault-tolerant systems, Computer, 30(4):51-58, Apr. 1997.

G.J.V.Nossal, Life, death and the immune system, Scientific American, 269(33)52-62, Sep. 1993.

S. A. Hofmeyr et al., Immunity by design: An Artificial immune system, Proc. 1999 Genetic and Evolutionary Computation Conference, pp. 1289-1296 Morgan-Kaufmann, 1999.

Special Report: sending astronauts to Mars. Scientific American, 282 (3):40-63, Mar. 2000.

Algirdas Avizienis, The hundred year spacecraft, Proceedings of the 1st NASA/ DoD Workshop on Evolvable Hardware, Pasadena, CA, Jul. 1999, pp. 233-239.

* cited by examiner ial application 60/709,492, filed Aug. 19, 2005.

HIERARCHICAL CONFIGURATIONS IN ERROR-CORRECTING COMPUTER SYSTEMS

This patent document claims priority of my provisional application 60/709,492, filed Aug. 19, 2005.

BACKGROUND

There exists a paradox in contemporary computing systems: they are used to protect various critical infrastructures of our society, such as electrical power, transportation, communication, etc., but they possess no identifiable error-detecting and -correcting infrasystem of their own. Such an infrasystem, or support architecture, should be (1) generic—that is, suitable for a variety of "client" computing systems—and (2) transparent to the client's software, but able to communicate with it, (3) compatible with and able to support other defenses that the client system employs, and (4) fully self-protected by ability to tolerate faults, immune to the client system's faults, including design faults, and to attacks by malicious software.

My present invention is an error-detecting and -controlling architecture with the above properties, imparting resilience to the overall computing system. My invention is preferably implemented entirely in hardware, to maximize system error-controlling dependability.

The following sections discuss conventional methods of noting and controlling errors in high-availability systems, and their shortcomings, and a principle of design I call "the immune system paradigm".

Error-sensing and -correction defenses in current high performance and availability platforms (servers, communication processors, etc.) are found at four different hardware levels: component (chip, cartridge, etc.), board, platform (chassis), and group of platforms COMPONENT LEVEL FAULT TOLERANCE—At the component level, the error detection and recovery mechanisms are part of the component's hardware and firmware. In general, we find very limited error detection and poor error containment in commercially available processors. For example, in Pentium and P6 processors error detection by parity only covers the memory caches and buses, except for the data bus which has an error correcting code, as does the main memory. All the complex logic of arithmetic and instruction processing remains unchecked. Recovery choices are "reset" actions of varying severity. The cancellation in April 1998 of the duplex "FRC" mode of operation eliminated most of the error containment boundary. All internal error detection and recovery logic remains entirely unchecked as well.

Similar error coverage and containment deficiencies are found in the high-end processors of most other manufacturers. The exceptions are IBM S1390 G5 and G6 processors that internally duplicate the arithmetic and instruction handling units and provide extensive error detection or correction and transient recovery for the entire processor. Near 100% error detection and containment are attained in the G5 and G6 processors, which carry on the legacy of fault tolerance from the IBM 9020—the last mainframe.

Intel too has an early record of building error-removal systems. The original design of the Pentium and P6 family of processors (except P4) includes the FRC (functional redundancy checking) mode of operation. In FRC two processors operate as a master checker pair that receives the same inputs. The checker internally compares its outputs to those of the master and issues the FRCERR signal when a disagreement is found. The master enters the Machine Check state upon receiving FRCERR. Operation in FRC mode provides near 100% error detection at the master's output and also makes the output an error containment boundary.

In April 1998, however, a set of specification changes was issued by Intel: "The XXX processor will not use the FRCERR pin. All references to these pins will be removed from the specification." (The "XXX" stands for all processors from Pentium to Pentium 111.) Deletion of FRC mode left the Pentium and P6 processors with very limited error detection and containment. No further explanation was provided by Intel for the change. My conjecture is that asynchronous inputs could not be properly handled in the FRC mode. Intel did not reply to my inquiry about the cause of FRC deletion.

Processors that do not have adequate error detection and containment can be made fault-tolerant by forming a self-checking pair with comparison (e.g., the FRC mode) or a triplet with majority voting on the outputs. Since the FRC mode deletion, there is a second deficiency of contemporary processors: they do not (or cannot) provide hardware support for comparison or voting operations.

FAULT TOLERANCE AT HIGHER LEVELS—At the board level, complete redundant hardware as well as software components are used to assure very high availability. The "hot standby" approach is especially widely used in the fields of embedded systems and telecommunications. Hot standby duplexing selectively duplicates the most critical subsystems, such as the CPU, power supplies, cooling fans, etc. Less costly error-containment techniques such as ECC, RAID, N+1 sparing, etc. are used for the remaining subsystems. The CPU boards present the greatest challenge: to detect faults in both CPUs and to execute a rapid switchover to the hot standby CPU when the active CPU is faulty. A good example of the state-of-the-art is the Ziatech high availability architecture. The critical elements that execute CPU switchover are three hardware modules and four software modules for each CPU. These modules must be operational to make a switchover possible, but they are not protected by fault tolerance themselves.

At the platform level a widely used technique is Intelligent Platform Management (IPM) that requires the introduction of the IPM hardware subsystem into the platform(s). It consists of additional on-the-market hardware (buses and controllers) and firmware that provides autonomous monitoring and recovery functions. Also provided are logging and inventory functions. The effectiveness of the IPM monitoring and recovery actions is limited by the error information outputs and recovery commands of the conventional processors of the platform. For example, the P6 processors have only a set of "reset" commands and five error signals (after deletion of FRCERR) whose coverage was estimated to be very limited.

Known IPM subsystems are not themselves protected by error containment or resilience. The cost of adding such attributes may be high because of the multiple functions of the IPM. The Version 1.5 of the IPM Interface Specification (implementation independent) has 395 pages, which represent a lot of functionality to be protected. Furthermore, the IPM does not support comparison or voting for redundant multichannel (duplex or triplex) computing. A cluster is a group of two or more complete platforms (nodes) in a network configuration. Upon failure of one node, its workload is distributed among the remaining a nodes. There are many different implementations of the generic concept of "clustering". Their common characteristic is that they are managed by cluster software such as Microsoft Cluster Service, Extreme Linux, etc. The main disadvantages for telecommunication or embedded systems are: (1) the relatively long recovery time (seconds); and (2) the cost of complete replication, including power consumption, replication of peripherals, etc.

The four approaches discussed above are at different levels and can be implemented in different combinations. The integration of the different error detection, recovery and logging techniques is a major challenge when two or more approaches are combined in the same platform.

THE DESIGN-FAULT PROBLEM—None of the approaches described above addresses the problem of tolerating deign faults in hardware ("errata") and in software ("bugs") of the COTS processors. Yet a study of eight models of the Pentium and P6 processors shows that by April 1999 from 45 to 101 errata had been discovered, and from 30 to 60 had remained unfixed in the latest versions ("steppings") of the processors. The discovery of errata is a continuing process. For example, consider the Pentium III. The first specification update (March 1999) listed 44 errata of which 36 remained unfixed in five steppings (until May 2001). From March 1999 to May 2001 35 new errata were discovered of which 22 remained unfixed. Other manufacturers also publish errata lists, but those of Intel are most comprehensive and well organized.

Most of the errata are triggered by rare events and are unlikely to cause system failures; yet the designers of error-sensitive systems cannot ignore their existence and the fact that more errata will be discovered after a system design is complete. Continuing growth of processor complexity and the advent of new technologies indicate that the errata problem will remain and may get worse in the future.

The most effective method of error detection and containment, particularly including errors arising in the design stage, is design diversity, i.e., multichannel computing in which each channel employs independently designed hardware and software, as in the Boeing 777 Primary Flight Control Computer. The Boeing and other diverse designs employ diverse COTS processors and custom hardware and software because few or no commercially available processors support multichannel compute ing. Design-spawned error correction by means of design diversity will become much less costly if it can be supported by commercially available hardware elements. It is also important to note that design diversity provides support for the detection and neutralization of malicious logic.

LIMITATIONS OF THE FOUR APPROACHES—The implementation of defenses at all or some of the above described four levels has led to the market appearance of many high-availability platforms (advertised as 99.999% or better) for server, telecommunications, embedded and other applications; however, all four approaches show deficiencies that impose limits on their effectiveness.

At the component level the Intel P6 and Itanium processors, as well as those of most other manufacturers (except IBM's G5 and G6) have a low error detection and containment coverage, leaving instruction handling and arithmetic entirely unchecked. After executing the Reset command most of the existing checks (bus EPC, parity, etc) are disabled and must be enabled by software that sets bits in the (unprotected) Power-On Configuration register. In general, critical recovery decisions are handed off to software.

At the board level, such as in "hot standby", unprotected "hard core" hardware and software elements handle the critical switchover procedure.

At the platform level the Intelligent Platform Management (IPM) hardware subsystem handles both critical recovery decisions and voluminous logging, configuration record keeping and communication management operations. The critical IPM element is the Baseboard Management Controller (BMC) that is itself unprotected and depends on interaction with software to carry out its functions.

At the cluster level that is software-controlled the disadvantages are long recovery times and the high cost of complete system (chassis) replication.

In summary, the weaknesses are:

1. the presence of unprotected "hard core" elements, especially in the error detection and recovery management hardware and software;
2. the comingling of hardware and software defenses: both must a succeed in order to attain recovery;
3. the absence of built-in support for multiple-channel computing that provides high coverage and containment, especially when design diversity is employed to attain design-fault tolerance.

It is my conclusion that during the explosive evolution of hardware over the past 25 years, computer hardware has not been adequately utilized for the assurance of error containment. This observation is not intended to unduly criticize or derogate the efforts of the very many talented and diligent workers in this field; however, these are exceedingly difficult problems, and the state of the art does leave ample room for refinements.

SUMMARY OF THE DISCLOSURE

The present invention introduces just such refinements. In preferred embodiments of its main aspects or facets, the invention is apparatus for controlling errors in a computing system that has plural modules. The apparatus includes a hierarchical error-correcting system.

It also includes at least two receiving connections, for reception by the hierarchical system of error messages from the plural modules of the computing system, respectively. In addition it includes at least two sending connections, for return by the hierarchical system of corrective responses to the plural modules of the computing system, respectively.

The foregoing may represent a description or definition of the first aspect or facet of the invention in its broadest or most general form. Even as couched in these broad terms, however, it can be seen that this facet of the invention importantly advances the art.

In particular, this first aspect of my present invention can not only resolve the previously outlined problems for each of the four levels considered singly—i.e., the component, board, platform, and cluster or "group" levels—but also provide resolution of those problems on an integrated and therefore extremely efficient basis. That is, the first facet of the invention deals with all four levels considered as an architecture or structure. The above-defined invention thus a provides error correction and containment from a hierarchical apparatus—one that can substantially parallel the hierarchy of the computing system itself.

The "computing system" mentioned above, in this broadest definition, is not itself part of the invention as most broadly defined—but rather is only a part of the context, or environment, of the invention. In other words, as the broadest of the appended claims make clear, a person who makes, uses or sells the error-controlling apparatus but not the computing system is making, using or selling my invention for purposes of infringement; however, as others of the appended claims also make clear, the computing system can be separately added into the defined invention, for purposes of defining infringement.

Although the first major aspect of the invention thus significantly advances the art, nevertheless to optimize enjoyment of its benefits preferably the invention is practiced in conjunction with certain additional features or characteristics. In particular, preferably the hierarchical system comprises at least two first-level (i.e., "top level") errors/corrections caches.

Each first-level errors/corrections cache holds:
a listing of error messages which respective modules of the computing system can send via one of the at-least-two receiving connections, and
a listing of respective corrective responses which respective modules of the computing system can receive via one of the at-least-two sending connections.

In addition each first-level errors/corrections cache comprises preprogrammed means for responding to receipt of any of the listed error messages from its respective module or modules by returning a respective corrective response.

Another preference is that the hierarchical system further include at least one second-level errors/corrections cache having:
at least two receiving connections for receiving error messages from the at least two first-level errors/correactions caches, respectively, and
at least two sending connections for returning corrective responses to the at least two first-level errors/correactions caches, respectively.

In yet another preference, the at least one second-level errors/corrections cache comprises at least two second-level errors/corrections caches. The at least one second-level errors/corrections cache further includes at least one third-level errors/corrections cache having:
at least two receiving connections for receiving error messages from the at least two second-level errors/corrections s, respectively, and
at least two sending connections for returning corrective responses to the at least two second-level errors/corrections caches, respectively.

Still another preference is that the apparatus further include at least one bottom-level errors/corrections cache that is supported by a "hypothalamus" module as described in this document. That module has some preprogrammed means for controlling interruption and restoration of power to the at least one bottom-level errors/corrections cache. The bottom-level errors/corrections cache is at an immediately higher level of the hierarchy, from the hypothalamus.

Another preference is that the apparatus additionally include at least one relatively higher-level errors/corrections cache, at a level above the bottom-level errors/corrections cache, supported by another hypothalamus having preprogrammed means for controlling interruption and reacheestoration of power to the at least one relatively higher-level errors/corrections cache. In this way the relatively higher-level errors/corrections cache can continue in operation if the first-mentioned hypothalamus (i.e., the hypothalamus that supports a bottom-level errors/corrections cache) fails.

Still another preference is that the apparatus also include— at further levels intermediate between the at least one third-level errors/corrections cache and the at least one bottom-level errors/corrections cache—one or more further errors/corrections caches. These errors/corrections caches are nested in substantially the same way as are the first-, second- and third-level errors/corrections caches introduced above.

If the plural computing-system modules include at least two diverse processors or programs, or both—for generating parallel candidate results from generally parallel computations in the at least two diverse processors or programs, respectively—then the apparatus preferably also includes at least one conflict-resolver module that compares the parallel results and eliminates one or more of the results.

It is to be understood, however, that such comparison and elimination is not limited to top-level modules, e.g. not limited to comparison and elimination of results from computing-system modules. Rather, the use of conflict resolvers can be applied to results from any, or even substantially all, of the errors/corrections caches in my hierarchical system.

Another preference is that at least one of the first-level errors/corrections caches, or indeed any errors/corrections cache, include in its respective listing an error-controlling message that removes power from the computing-system module (or other module) whose results are eliminated. A related preference is that at least one of the errors/corrections caches includes in its respective listing a corrective message that inserts, powers up and provides initial data for a spare unit in place of such computing-system module (or other module) whose results are eliminated.

It is further preferred that at least the error-correcting system be in the form of a so-called "System on Chip" or "SoC". People skilled in this field will understand that the computing system too can be included in the same chip as desired.

In preferred embodiments of its second major independent facet or aspect, the invention is a method of correcting errors in a computing system that has multiple modules in a hierarchical configuration. The method includes these steps:
1) providing a hierarchical error-controlling system having a configuration that very generally parallels the hierarchical configuration of the computing system;
2) providing a multiplicity of interconnections between elements of the computing system and corresponding elements of the very generally parallel error-controlling system, respectively; and
3) in event of errors by elements of the computing system:
passing error messages from the computing-system elements to the corresponding error-correcting-system elements, by way of the interconnections, and
returning corrective messages from the error-correcting-system elements to the computing-system elements, by way of the interconnections.

The foregoing may represent a description or definition of the second aspect or facet of the invention in its broadest or most general form. Even as couched in these broad terms, however, it can be seen that this facet of the invention importantly advances the art.

In particular, analogously to the advancement provided in regard to the above-discussed first facet of the invention, the above-defined second aspect of the invention provides error control and containment from a hierarchical apparatus that not only can but expressly does generally parallel the hierarchy of the computing system itself.

Although the second major aspect of the invention thus significantly advances the art, nevertheless to optimize enjoyment of its benefits preferably the invention is practiced in conjunction with certain additional features or characteristics. In particular, preferably the various apparatus preferences of the first, apparatus aspect of the invention are practiced in relation to this second, method facet of the invention as well.

In preferred embodiments of its third major independent facet or aspect, the invention is apparatus that comprises—in a single combination—all or almost all of the features and relationships mentioned above in connection with the first aspect of the invention and its related preferences. Here too, the error-corrected computing system is for some purposes regarded as part of the invention environment or context, and for other purposes regarded as part of the invention itself—all as more specifically set forth in the various appended claims. The preferences described as to the first facet of the invention are applicable in regard to this third aspect too.

DETAILED DESCRIPTION OF PREFERRED EMBODIMENTS

1. A Design Principle: the Immune System Paradigm

At the beginning of this document, I identified four attributes that were needed by an error-correcting resilience assembly, which I see as the "missing link" in the defenses of conventional systems, as reviewed in the preceding section. The basic error-correcting assembly, considered alone, is not the present invention; rather, the invention here goes beyond the basic error-correcting assembly. That basic assembly, however, will be introduced first—in this section and sections 2 and 3 below.

The basic error-correcting assembly should be generic, transparent to client software, compatible with defenses used by the client, and fully self-protected. It appears that an all-hardware assembly is most likely to meet those goals, since stored programs do not need to be protected. The assembly needs nonvolatile storage for record-keeping and ROM microcode for sequencing operations.

One way to appreciate the requirements and characteristics of my proposed error-controlling assembly is to analogize it to the Immune system of the human body. To develop this reasoning, I use the following three analogies:
1. the body is analogous to hardware,
2. consciousness is analogous to software,
3. the immune system is analogous to my novel error-controlling assembly, or resilience support architecture.

Four fundamental attributes of the immune system are particularly relevant:
1. It functions (i.e., detects and reacts to threats) continuously and autonomously, independently of consciousness.
2. Its elements (lymph nodes, other lymphoid organs, lymphocytes) are distributed throughout the body, serving all its organs.
3. It has its own communication links—the network of lymphatic vessels.
4. Its elements (cells, organs, and vessels) themselves are self-defended, redundant and in several cases diverse.

Now I can identify the properties that the error-controlling assembly must have in order to justify the immune-system analogy. They are as follows.

1a. The assembly consists of hardware and firmware elements only.

1b. The assembly is independent of (requires no support from) any software of the client platform, but can communicate with it.

1c. The assembly supports (provides protected decision algorithms for) multichannel computing of the client platform, including diverse hardware and software channels to provide design-fault tolerance for the client platform.

2. The assembly is compatible with (i.e., protects) a wide range of client platform components, including processors, memories, supporting chipsets, discs, power supplies, fans and various peripherals as well.

3. Elements of the assembly are distributed throughout the client platform and are interconnected by their own autonomous communication links.

4. The error-controlling assembly is fully resilient itself, requiring no external support. It is not susceptible to attacks by intrusion or malicious software and is not affected by natural or design faults of the client platform.

A different and independently devised analogy of the Immune system is the "Artificial Immune System" (AIS) of S. Forrest and S. A. Hofmeyr. Its origins are in computer security research, where the motivating objective was protection against illegal intrusions. The analogy of the body is a local-area broadcast network, and the AIS protects it by detecting connections that are not normally observed on the LAN. Immune responses are not included in the model of the AIS, while they are the essence of my assembly.

2. Architecture of the Elemental Error-Correcting Assembly

The unit error-correcting assembly is a system composed of four types of special-purpose controllers, modules 42 through 46, and closely associated elements 21 through 24 (FIG. 1). These modules are ASICs (application-specific integrated circuits) that are controlled by hardwired sequencers or by read-only microcode.

This assembly of correction modules serves and protects a primary-function module 41 that is essentially a conventional computing block such as a standard processor. The primary-function module 41 is a client system, in the sense that it is this module that performs the computing work which the entire computing system exists to perform.

In some of the appended claims, this protected conventional computing block 41 is treated as part of my invention itself, and in other claims it is instead treated as a part of the context or environment of my invention.

Redundant modules (not shown) are provided for fault tolerance of the apparatus itself. One interface module 42 is provided for each primary-function module 41. All error-signal outputs 32 and recovery-command inputs 33 of the primary-function module 41 are connected through its interface module 42. Within the assembly 42-46, 21-24, all interface modules 42 are connected to one errors/corrections cache 44 via the errors/corrections bus 34.

Each interface module also has a direct input (the error-alert pin 45) to the errors/responses cache 44. An interface module 42 conveys primary-function module error messages 32 to the errors/corrections cache 44. It also receives recovery commands 33 from the errors/corrections cache 44 and issues them to the primary-function module 41 inputs. The error-alert pin 45 serves to request errors/corrections cache 44 attention for an incoming error message 32 on the errors/responses bus 34.

The errors/corrections cache 44 stores in ROM all error signals from every expected type of primary-function module 41, and also all prepared responses to those known error types—as well as the sequences for its own recovery. This "errors/corrections cache" also stores system configuration and system time data, and its own activity records—these three functions necessarily of course being read/write.

The errors/corrections cache 44 is also connected to the so-called "hypothalamus" module 46. As will be seen, this module is named aptly in that it is one element of the assembly which never powers down completely, and it maintains function (or nonfunction, as may be the case) of all the other modules at a very fundamental level.

More specifically, the functions of the hypothalamus 46 are to control power-on and power-off sequences for the entire system, to generate fault-tolerant clock signals and to provide nonvolatile, radiation-hardened storage for system time and configuration. The hypothalamus has a reserve electrical source (a battery) 23 and remains on at all times during the life of the error-controlling assembly 21-24, 31-38, 42-46 and the primary-function module 41.

The conflict-resolver module 43 provides resilient comparison and voting services for the other modules. If there are plural primary-function modules 41, especially diverse processor types and perhaps operating multiversion software, then the resolver 43 includes decision algorithms for handling possibly divergent computation results from such diverse software or processors in the primary-function modules 41. Fast response of the resolver 43 is facilitated by hardware implementation of such algorithms.

This same conflict-resolver module 43 also keeps a log of disagreements in the decisions. Another function of the resolver 41 is to serve as a communication link between the software of the primary-function module or modules 41 and the errors/corrections cache 44. Primary-function modules 41 may request configuration and errors/correactions cache-activity data or send power-control commands, and some of these advantageously pass via the resolver 43. The resolver 43 is linked by a built-in interface 42 to the errors/corrections cache 44.

Another function of the resilient error-controlling assembly 21-24, 31-38, 42-46 is to provide resilient power management for the entire system, including individual command-resettable breakers 24 (essentially power switches) for each primary-function module 41. Every module except the hypothalamus 46 has such a breaker. The upper-level modules of the assembly as a group have their own resilient operational electrical source 21. The errors/corrections cache 44 and hypothalamus 46 have a separate "support" source 22.

3. Resilience of the Assembly

The partitioning of the error-correcting assembly is motivated by the need to make it resilient. The interface and resolver 42, 43 are self-checking pairs, since high error-detection coverage is essential, while spare primary-function and resolver modules 41, 43 can be provided for recovery under control of the error-response commands stored in the errors/corrections cache 44. The errors/corrections cache 44 should be continuously available; therefore the system advantageously uses triplication and voting (TMR), with spare errors/corrections caches added for longer life.

The hypothalamus 46 manages errors/corrections cache replacement and also shuts the system down in case of catastrophic events (temporary power loss, heavy radiation, etc.). The hypothalamus functions are advantageously protected by provision of two or more self-checking hypothalamus pairs (not shown), each with its own backup electrical source. In my development of this invention, I separated the hypothalamus from the errors/corrections cache to make the apparatus cluster (that is to say, a "hypothalamus cluster" 46) that must survive catastrophic events as small as possible.

The all-hardware implementation of the assembly makes it safe from software bugs and external attacks. The one exception is the power management command from the primary-function module 41 to the errors/correactions cache 44 (via the resolver 43) which could be used to shut the system down. Special protection is needed here. The adverse influence of any hardware design faults in the resilient assembly can be minimized by design diversity, both of self-checking pairs and of errors/corrections caches; however, the logic of all the modules is very simple and their complete verification should be possible.

When interconnected, the modules 42-46, 21-24 of my assembly and the typically conventional primary-function module 41 form a computing system that is protected against most causes of system failure. This system is the first example of an implementation of the immune system paradigm.

The use of the resilient support assembly is likely to be affordable for most computer systems, since the interface, errors/corrections cache, resolver and hypothalamus cluster 42, 44, 43 46 have simple internal structure. Some truly challenging missions can be justified only if their computers, together with my resilient assembly, have very high coverage as to design faults and as to catastrophic transients due to radiation. Extensive sparing and efficient power management can also be provided by the resilient assembly.

Given that the MTBF of contemporary processor and memory chips is approaching 1000 years, missions that can be contemplated include the 1000-day manned mission to Mars with the dependability of a 10-hour flight in a commercial airliner. Another possibility is unmanned very-long-duration interstellar missions, using a fault-tolerant relay chain of modest-cost spacecraft—using my resilient assembly particularly as described in this document.

One thrust of my error-controlling resilient assembly, described above, is to use hardware more extensively and more effectively than is done conventionally in providing resilience for very dependable high-performance platforms.

My basic resilient-assembly invention, as set forth above, considered Intel's P6 family of processors and their supporting chipsets as the commercially available elements of the host platform. These elements were not designed to utilize my resilient assembly, which accordingly is introduced by a "retrofit."

4. A Hierarchical Architecture

As noted earlier the basic, or unit, error-correcting assembly introduced just above—considered alone—is not itself the present invention. I shall now move on to describe preferred embodiments of the present invention.

This invention is an extension of the basic resilient assembly. Preferred embodiments incorporate the basic assembly into a hierarchical form, together with packaging of the entire hierarchical resilience support system into a single "System on Chip" ("SoC").

It is to be understood that the hierarchical configuration can be used without building the system as an SoC. The two together, however, make the invention a particularly powerful combination.

Figure 2:
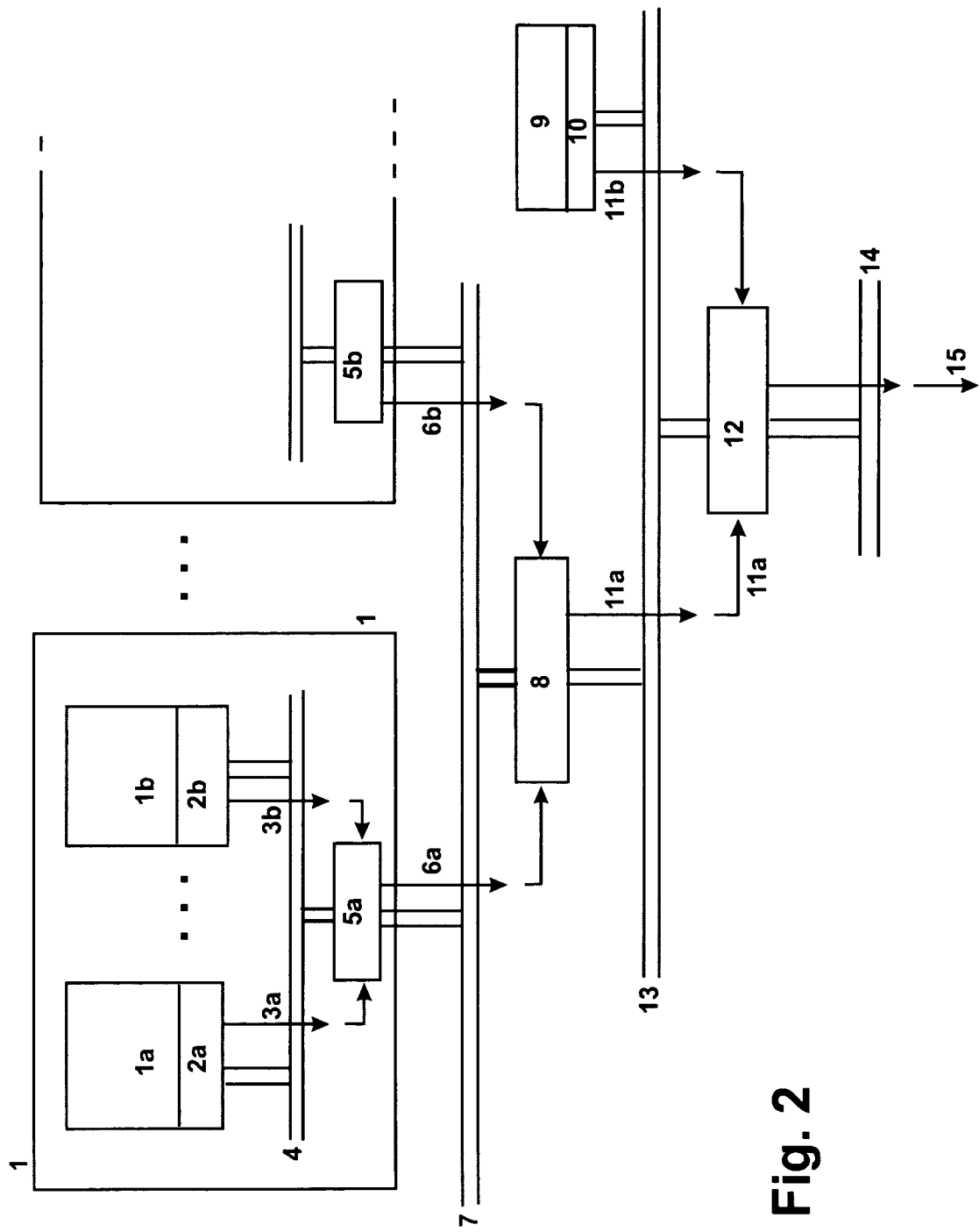

Each primary-function module 1a, 1b . . . (FIG. 2) of the SoC is provided with an interface 2a, 2b similar to the interface 42 (FIG. 1) of the resolver 43 in the basic assembly. As mentioned earlier, use of resolver modules (or interfaces, or both) in my hierarchical assembly is by no means restricted to the upper-level modules that most directly protect and support primary-function computing systems.

To the contrary, resolvers or interfaces, or both, provide a broad capability useful throughout preferred embodiments of my invention. For example they are advantageously used as well to compare, and make decisions about, results from any of the modules—e.g., intermediate- or even lower-level errors/corrections caches—in my hierarchical system.

Not all protected activity begins at the first (i.e. top) level. For instance a monitor, or printer, or any number of other single replaceable items, may be found in a lower level— serving errors/corrections caches etc. in the lower tiers of either the primary apparatus hierarchy or my parallel protective hierarchical error-controlling system.

Errors/corrections caches 5a, 5b are separate blocks within the SoC, and the errors/corrections bus 4 connects the errors/corrections caches, as a cluster, to each block of the SoC that also has the individual error-alert pins 3a, 3b connected to the errors/corrections cache 5a. The resolver 43 (FIG. 1) can also be replaced by a "resolver port" that is part of the SoC block. The SoC has a complete built-in basic resilient assembly, as described above.

The hierarchical refinement of my resilient-assembly concept takes place as follows. The errors/corrections cache cluster 5a of one SoC 1—i.e., errors/corrections cache$_{SOC}$ 5a—serves as the interface 42 (FIG. 1) of the SoC, with respect to a lower-level errors/corrections cache cluster, errors/corrections cache$_{BOARD}$ 8 that protects several SoC packages located on the same board.

This errors/corrections cache$_{BOARD}$ is a separate SoC that serves as the interface 42 (FIG. 1) of the entire board. It is also connected to every SoC by the errors/corrections bus 7 for the board, as well as error-alert pins 6a, 6b from each SoC.

One chassis contains several boards and other subsystems: monitor, printer, hard disk, etc. Each board has its errors/corrections cache$_{BOARD}$ 8 serving as an interface 42 (FIG. 1) connected to a chassis-level errors/corrections cache cluster, errors/corrections cache$_{CHASSIS}$ 12. Other subsystems 9 of the chassis also must be provided with interfaces 10 that are connected by error-alert pins 11a, 11b and the chassis errors/corrections bus 13 to the errors/corrections cache$_{CHASSIS}$ 12, analogously to the boards.

A further extension or refinement of the hierarchy applies to a group of chassis that again in turn has an errors/corrections cache$_{GROUP}$. The latter in turn is connected by an errors/corrections bus 14 of the chassis group and by individual error-alert pins 15 to all errors/corrections cache$_{CHASSIS}$ modules 12.

A still-further refinement to a network of chassis groups is the next step. In some cases the provision of an errors/corrections bus and individual error-alert pins may be more difficult, especially if the chassis groups are widely separated physically.

Thus a hierarchical error-controlling system according to preferred embodiments of my invention has a nested kind of tiered structure. In this nested structure, each major element 2a, 5a or 8 in a given tier and of a certain type reports to and is controlled by a lower-level element 5a, 8 or 12 respectively, which is of that same certain type—but which controls a relatively large number (i.e., a plurality or preferably a multiplicity) of like major elements 2b, 5b or 10, respectively, in the given tier.

More specifically the certain type of element is in the nature of an errors/corrections cache 44 (FIG. 1). In preferred embodiments of my hierarchical system, however, that element type also performs the function of an interface 42 module for one or more elements in a higher tier.

The hierarchical system of my present invention has important advantages, as compared with the unit error-controlling architecture introduced in section 2 above. These advantages particularly include very significant increases in practicality and effectiveness.

It will be understood that just one single errors/corrections cache 44 (FIG. 1) can serve for an entire chassis, but for best performance it would require interface 42 connections to virtually every chip and other device on the chassis. That in turn would call for many error-alert pins, and a potential excess of messages waiting for access to the error/corrections bus 34.

Therefore a hierarchical structure is a more satisfactory solution. Again, each board has its own errors/corrections cache cluster, and all of those report to a chassis-level errors/corrections cache cluster 12 that watches for errors on all of the boards.

The board errors/corrections cache cluster 8 performs the role of the interface 42 for the entire board, and obeys commands received from the chassis errors/corrections cache cluster. As indicated above, the hierarchy can be extended further, based upon the same rationale.

My novel hierarchical system is especially effective and advantageous if incorporated into a single "System on Chip" or SoC that itself includes several relatively large blocks—processors, memories, etc. that all fit on one package. Therefore it makes sense to build in an error-controlling resilience support system for the SoC.

As it is built in, the overall arrangement has to be done during design—it cannot be retrofitted. Every block now has an interface (like interface 42, FIG. 1).

The SoC adds a errors/corrections cache cluster (also designed as one SoC block) that serves as interface for the entire SoC chip, and that communicates to the board-level errors/corrections cache cluster 8. The latter is most naturally a separate chip for the board.

As a practical matter, error messages sent from the computing system to the hierarchical error-controlling system are of a sort that is very closely related to the kind of computing system in use, and its particular computing functions. Likewise the corrective responses returned from the hierarchical error-control system to the computing system depend very specifically on the character and functions of the computing system.

Hence if the SoC is intended to be generic, and to have many signal lines for connection to the computing system after manufacture of the SoC, then preferably the SoC includes a Ram or PROM section which can be filled (or "programmed", so to speak) after manufacture of the rest of the SoC. This arrangement customizes the SoC to those computing functions and character—or in other words supplies the particular error messages and corrective responses required by the computing system.

My new hierarchical system is suitable for future commercial processors as well as other commercial chips. They should accordingly be provided with an interface module.

For present commercial chips, unfortunately no error-controlling resilience support system is available. A hierarchical overall architecture nevertheless can be made available by providing an interface module—or group of modules—as a separate chip.

5. Applications of the Hierarchical Error-Control System

Such a refined hierarchical error-control support system is highly resilient and provides—as further embodiments of my invention—major complexes of equipment, over a broad range of applications. These equipment complexes function based upon error-detection, -correction and -containment assemblies which are thereby made extremely dependable.

These embodiments of my invention are advanced beyond any practical major equipment complexes of the present day. This is true because the computing functions of all such conventional major apparatus complexes are vulnerable to errors that are essentially undetectable, and therefore uncontrollable. Such errors arise in catastrophic events ranging from natural disaster through simple malicious hacking to terrorist intervention. These forms of my invention are especially critical in cases where human lives depend on the continuous and correct operation of the incorporated computing system—together with its in-turn incorporated, refined hierarchical resilience support system.

Figure 3:
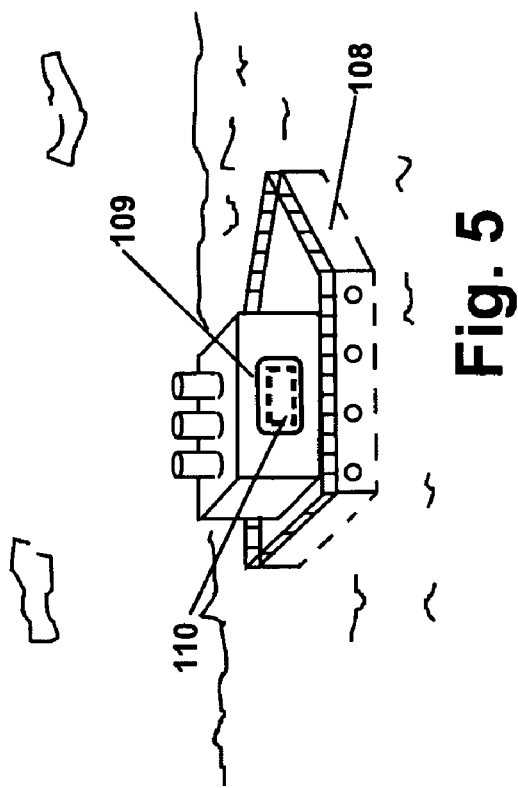

Thus one embodiment of the invention is a manned spacecraft 103 (FIG. 3) from Earth 101, on a long mission 102 such as exploration of the planet Mars 104. The craft 103 is a major apparatus or equipment complex. Incorporated into the craft 103 of my invention is a computing system 105 which controls functioning of the craft, and which in turn includes (or has associated) a refined hierarchical error-controlling assembly 110 —according to my present invention—that protects the computing system 105.

Figure 4:
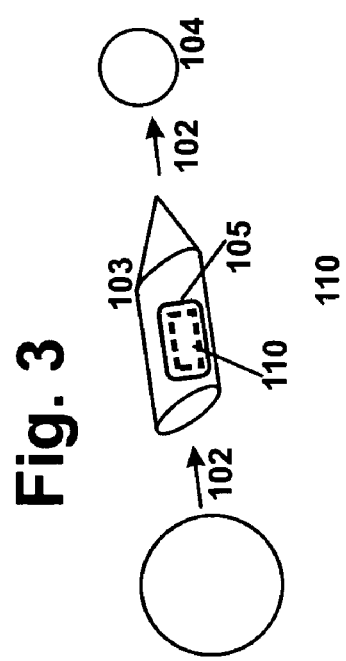

Another embodiment of the invention is the protected computing system 105, together with the associated or included hierarchical assembly 110. Yet another embodiment is the hierarchical assembly 110 itself. Another embodiment of my invention is a human habitat 106 (FIG. 4) to be located on a planet 104, e.g. Mars, and including a computing system 107, which in turn has associated or includes the hierarchical assembly 110 of my present invention. Such a human habitat 106 is a major equipment or apparatus complex according to my invention. As will be understood, earthbound complexes such as skyscrapers, energy-generation facilities, and scientific research centers if protected by my novel hierarchical assembly 110 are likewise embodiments of my invention.

Still another embodiment of my invention is the included (and protected) computing system 107 that operates the habitat 106 or other major complex. Yet another embodiment is the included or associated protective hierarchical assembly 110.

Figure 5:
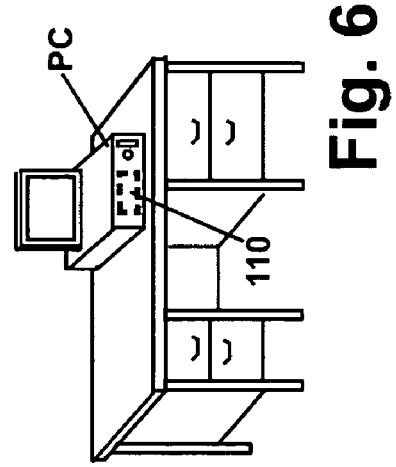

Perhaps much simpler but also critical embodiments of my invention are vehicles such as an ocean liner 108 (FIG. 5) that incorporates a computing system 109 which controls the vehicle and is protected by the novel hierarchical assembly 110 of my present invention. Likewise other embodiments are other kinds of vehicles for the transportation of humans on Earth—such as automobiles, airplanes and railroad trains. Further embodiments of my invention include the computing system 109, as well as the hierarchical assembly 110 itself.

Figure 6:
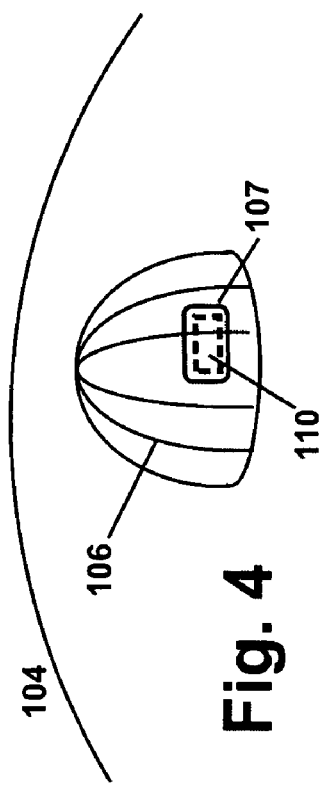

At a smaller physical scale are other important types of hierarchical-assembly-protected apparatus including commodity computing systems such as a server or a desktop personal computer PC (FIG. 6). Such a computer PC, which is an embodiment of my invention, includes or has associated a hierarchical assembly 110.

In certain of the appended apparatus claims, the term "such" is used (instead of "said" or "the") in the bodies of the claims, when reciting elements of the claimed invention, for referring back to features which are introduced in preamble as part of the context or environment of the claimed invention. The purpose of this convention is to aid in more distinctly and emphatically pointing out which features are elements of the claimed invention, and which are parts of its context—and thereby to more particularly claim the invention.

The foregoing disclosures are intended to be merely exemplary, and not to control the scope of my invention—which is defined by the appended claims.

REFERENCES

The references page previously submitted is unchanged.

I claim:

1. Apparatus for correcting errors, said errors being in a computing system that has plural modules, and said modules having a structural computing-module hierarchy; and said apparatus comprising:
    an error-correcting system having a structural error-correcting hierarchy that is based upon and generally parallels the structural computing-module hierarchy;
    at least two receiving connections, for reception by the hierarchical error-correcting system of error messages from hierarchically corresponding plural modules of the computing system, respectively; and
    at least two sending connections, for return by the hierarchical error-correcting system of corrective responses to hierarchically corresponding plural modules of the computing system, respectively; and wherein:
the error-correcting system waits for error messages from the computing system; and
each of the corrective responses initiates correction entirely automatically;
wherein the hierarchical error-correcting system comprises at least two first-level errors/corrections caches, each one holding:
    a listing of error messages which respective modules of the computing system can send via one of the at-least-two receiving connections, and
    a listing of respective corrective responses which respective modules of the computing system can receive via one of the at-least-two sending connections; and
each first-level errors/corrections cache comprises preprogrammed means for responding to receipt of any of the listed error messages from its respective module or modules by returning a respective corrective response;
wherein the hierarchical system further comprises at least two second-level errors/corrections caches, each one having:
    at least two receiving connections for receiving error messages from said at least two first-level errors/corrections caches, respectively, and
    at least two sending connections for returning corrective responses to said at least two first-level errors/corrections caches, respectively; and
said apparatus further comprising at least one third-level errors/corrections cache having:
    at least two receiving connections for receiving error messages from said at least two second-level errors/corrections caches, respectively, and
    at least two sending connections for returning corrective responses to said at least two second-level errors/corrections caches, respectively.

2. The apparatus of claim 1:
in further combination with said computing system;
wherein the computing system comprises power connections controlled by said corrective responses, each of said corrective responses following a respective hardware connection from the error-correcting system directly.

3. The apparatus of claim 1:
further comprising at least one bottom-level errors/corre-actions cache that is supported by a hypothalamus having preprogrammed means for controlling interruption and restoration of power to the at least one bottom-level errors/corrections cache.

4. The apparatus of claim 2, further comprising:
at least one relatively higher-level, at a level above said bottom-level errors/corrections cache, that is supported by another hypothalamus having preprogrammed means for controlling interruption and restoration of power to the at least one relatively higher-level errors/corrections cache;
whereby the relatively higher-level errors/corrections cache can continue in operation if the hypothalamus that supports the bottom-level errors/corrections cache fails.

5. The apparatus of claim 2, further comprising:
at further levels intermediate between the at least one third-level errors/corrections cache and the at least one bottom-level errors/corrections cache, one or more further errors/corrections caches that are nested in substantially the same way as the first-, second- and third-level errors/corrections caches.

6. The apparatus of claim 1, for use if the plural computing-system modules comprise at least two diverse processors or programs, or both, for generating parallel candidate results from generally parallel computations in the at least two diverse processors or programs, respectively; said apparatus further comprising:
at least one conflict-resolver module that compares the parallel results and eliminates one or more of the results.

7. The apparatus of claim 6, wherein:
the hierarchical error-correcting system comprises at least two first-level errors/corrections caches, each holding:
   a listing of error messages which the respective modules of the computing system can send via one of the at-least-two receiving connections, and
   a listing of respective corrective responses which the respective modules of the computing system can receive via one of the at-least-two sending connections; and
each first-level errors/corrections cache comprises preprogrammed means for responding to receipt of any of the listed error messages from its respective module or modules by returning a respective corrective response; and wherein:
at least one of the errors/corrections caches includes in its respective listing:
   a corrective message that removes power from the computing-system module, or from a higher-level errors/corrections cache, whose results are eliminated, and
   a corrective message that inserts, powers up and provides initial data for a spare unit in place of the computing-system module, or a higher-level errors/corrections cache, whose results are eliminated.

8. The apparatus of claim 1, wherein:
at least the error-correcting system is in the form of a System on Chip (SoC).

9. The apparatus of claim 2:
in further combination with said computing system;
wherein the computing system comprises connections controlled by said corrective responses, each of said connections in the computing system being a hardware connection among or within modules of the computing system.

10. The apparatus of claim 9, wherein:
said hardware connections are switchable by said corrective responses.

11. The apparatus of claim 1, wherein:
each of said connections is respectively a single-purpose connection.

12. The apparatus of claim 1, wherein:
the apparatus is fault resilient.

13. Apparatus for correcting errors, said errors being in a computing system that has plural modules, and said modules having a structural computing-module hierarchy; said apparatus being for use if the plural computing-system modules comprise at least two diverse processors or programs, or both, for generating parallel candidate results from generally parallel computations in the at least two diverse processors or programs, respectively; and said apparatus comprising:
an error-correcting system having a structural error-correcting hierarchy that is based upon and generally parallels the structural computing-module hierarchy;
at least two receiving connections, for reception by the hierarchical error-correcting system of error messages from is hierarchically corresponding plural modules of the computing system, respectively; and
at least two sending connections, for return by the hierarchical error-correcting system of corrective responses to hierarchically corresponding plural modules of the computing system, respectively; and wherein:
the error-correcting system waits for error messages from the computing system; and
each of the corrective responses initiates correction entirely automatically;
wherein the hierarchical error-correcting system comprises at least two first-level errors/corrections caches, each one holding:
   a listing of error messages which respective modules of the computing system can send via one of the at-least-two receiving connections, and
   a listing of respective corrective responses which respective modules of the computing system can receive via one of the at-least-two sending connections; and
each first-level errors/corrections cache comprises preprogrammed means for responding to receipt of any of the listed error messages from its respective module or modules by returning a respective corrective response;
wherein the hierarchical system further comprises at least one second-level errors/corrections cache having:
   at least two receiving connections for receiving error messages from said at least two first-level errors/corrections caches, respectively, and
   at least two sending connections for returning corrective responses to said at least two first-level errors/corrections caches, respectively;
said apparatus further comprising at least one conflict-resolver module that compares the parallel results and eliminates one or more of the results.

14. The apparatus of claim 13, wherein:
at least one of the errors/corrections caches includes in its respective listing a corrective message that removes power from the computing-system module, or from a higher-level errors/corrections cache, whose results are eliminated.

15. The apparatus of claim 13, wherein:
at least one of the errors/corrections caches includes in its respective listing a corrective message that inserts, powers up and provides initial data for a spare unit in place of the computing-system module, or a higher-level errors/corrections cache, whose results are eliminated.

16. The apparatus of claim 13, wherein:
the apparatus is fault resilient.

17. Apparatus for correcting errors,
said errors being in a computing system that has plural modules in a first hierarchical structure and that comprise at least two diverse processors or programs, or both, for generating parallel candidate results from generally parallel computations in the at least two diverse processors or programs, respectively; said apparatus comprising:
a hierarchical error-correcting system having a second hierarchical structure that substantially parallels the first hierarchical structure of the computing modules;
at least two receiving connections, for reception by the second hierarchical structure of error messages from the modules of the computing system, respectively; and
at least two sending connections, for return by the second hierarchical structure of corrective responses to the modules of the computing system, respectively;

wherein the second hierarchical structure comprises at least two first-level errors/corrections caches, each first-level errors/corrections cache holding:
- a listing of error messages which the respective modules of the computing system can send via one of the at-least-two connections, and
- a listing of respective corrective responses which the respective modules of the computing system can receive via the second of the at-least-two connections;

wherein each first-level errors/corrections cache comprises preprogrammed means for responding to receipt of any of the listed error messages from its respective module or modules by returning a respective corrective response; and wherein the hierarchical system further comprises at least two second-level errors/corrections caches, each having:
- at least two receiving connections for receiving error messages from said at least two first-level errors/corrections caches, respectively, and
- at least two sending connections for returning corrective responses to said at least two first-level errors/corrections caches, respectively; and further comprising at least one third-level errors/corrections cache having:
- at least two receiving connections for awaiting, and for receiving, error messages from said at least two second-level errors/corrections caches, respectively, and
- at least two sending connections for returning corrective responses to said at least two second-level errors/corrections caches, respectively, all said corrective responses being applied entirely automatically to initiate recovery;

further comprising at least one bottom-level errors/corrections cache that is supported by a hypothalamus having press programmed means for controlling interruption and restoration of power to the at least one bottom-level errors/corrections cache;

further comprising, at further levels intermediate between the at least one third-level errors/corrections cache and the at least one bottom-level errors/corrections cache, one or more further errors/corrections caches that are nested in substantially the same way as the first-, second- and third-level errors/corrections caches; and further comprising at least one conflict-resolver module that compares the parallel results and eliminates one or more of the results; and wherein:

at least one of the first-level errors/corrections caches includes in its respective listing a corrective message that removes power from the computing-system module whose results are eliminated.

18. The apparatus of claim 17:
in further combination with said computing system;
wherein the computing system comprises power connections controlled by said corrective responses, each of said corrective responses following a respective hardware connection from the error-correcting system directly.

19. The apparatus of claim 18, wherein:
at least the error-correcting system is in the form of a System on Chip (SoC).

20. The apparatus of claim 17, wherein:
the apparatus is fault resilient.

\* \* \* \* \*